(12) United States Patent
Akiyama

(10) Patent No.: US 7,288,899 B2
(45) Date of Patent: Oct. 30, 2007

(54) LIGHT SOURCE, PROJECTOR, AND METHOD OF DRIVING ARC TUBE

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 320 days.

(21) Appl. No.: 11/129,378

(22) Filed: May 16, 2005

(65) Prior Publication Data

US 2005/0258779 A1    Nov. 24, 2005

(30) Foreign Application Priority Data

May 20, 2004    (JP)    ............................. 2004-150465

(51) Int. Cl.
*H05B 37/00*    (2006.01)
(52) U.S. Cl. ..................... 315/291; 315/224; 353/37; 362/296
(58) Field of Classification Search ............... 315/291, 315/224; 353/98, 37; 362/296, 298
See application file for complete search history.

(56) References Cited

U.S. PATENT DOCUMENTS 4,988,918 A * 1/1991 Mori et al. ................. 313/641

5,491,525 A * 2/1996 Yamasaki et al. ............. 353/98
5,589,726 A * 12/1996 Gold .......................... 313/161

FOREIGN PATENT DOCUMENTS

| JP | A 06-289394 | 10/1994 |
|---|---|---|
| JP | A-09-120067 | 5/1997 |
| JP | A 11-143378 | 5/1999 |

* cited by examiner

*Primary Examiner*—David H. Vu
(74) *Attorney, Agent, or Firm*—Oliff & Berridge, PLC

(57) ABSTRACT

Aspects of the invention can relate to a light source that includes a light source lamp and an arc-tube drive unit. The light source lamp can include an arc tube that emits light between a pair of electrodes, a reflector that reflects the light from the arc tube to a region to be illuminated, and an auxiliary mirror that reflects the light emitted from the arc tube to the region to be illuminated toward the reflector. The arc-tube drive unit can drive the arc tube with an alternating current so that, of the pair of electrodes of the arc tube, the brightness of a first luminescent point generated in the vicinity of a first electrode adjacent to the auxiliary mirror is lower than the brightness of a second luminescent point generated in the vicinity of a second electrode remote from the auxiliary mirror.

11 Claims, 5 Drawing Sheets

LIGHT SOURCE, PROJECTOR, AND METHOD OF DRIVING ARC TUBE

BACKGROUND

Aspects of the invention can relate to a light source, a projector, and a method of driving an arc tube.

Related art light source lamps used in light sources for projectors generally have an arc tube and a reflector that reflects the light from the arc tube into a region to be illuminated. It is preferable for this type of light source lamps to make effective use of the light from the arc tube as much as possible.

Accordingly, as a technique for making the best use of the light from the arc tube, a light source lamp can be provided that further includes an auxiliary mirror that reflects the light emitted from the arc tube into a region to be illuminated toward a reflector. See, for example, Japanese Patent Application Publication No. 11-143378 (FIG. 1) and No. 6-289394 (FIG. 1).

FIG. 7 is a schematic diagram of a related art light source lamp disclosed in JP-A-11-143378. FIG. 8 is a schematic diagram of a related art light source lamp disclosed in JP-A-6-289394.

As shown in FIG. 7, the light source lamp 710 disclosed in JP-A-11-143378 is constructed in such a manner that the light emitted from an arc tube 712 into a region to be illuminated is reflected toward a reflector 714 by an auxiliary mirror 716 mounted to the arc tube 712. As shown in FIG. 8, the light source lamp 810 disclosed in JP-A-6-289394 is constructed in such a manner that the light emitted from an arc tube 812 into a region to be illuminated is reflected toward a reflector 814 by an auxiliary mirror 816 made of a reflection layer formed on the arc tube 812.

Accordingly, the light source lamps 710 and 810 are allowed to make use of the light from the arc tube, which has not been used effectively because it is radiated toward a region to be illuminated, by using the auxiliary mirrors 716 and 816, respectively, to increase light use efficiency. Also, there is no need to use a large-scale reflector that covers the arc tube, allowing the reduction in the size of the light source lamp.

However, with such related art light source lamps including the auxiliary mirror, even when the base material or reflection layer of the auxiliary mirror is made of an infrared transparent material, the maximum temperature of an electrode (an electrode A shown in FIGS. 7 and 8) of a pair of electrodes of the arc tube adjacent to the auxiliary mirror tends to become as high as 30° C. to 50° C. under the present circumstances. This results in the problem that the electrode adjacent to the auxiliary mirror is deteriorated earlier than that without the auxiliary mirror, resulting in a decrease in the life of the arc tube.

SUMMARY

An advantage of the invention can be to provide a light source in which an electrode adjacent to an auxiliary mirror is prevented from deteriorating early, resulting in a decrease in the life of an arc tube. Another advantage is to provide a projector that can include such an excellent light source. Yet another advantage is to provide a method of driving an arc tube in which the electrode adjacent to the auxiliary mirror is prevented from deteriorating early, resulting in a decrease in the life of the arc tube.

An exemplary light source according to a first aspect of the invention includes a light source lamp and an arc-tube drive unit. The light source lamp can include an arc tube that emits light between a pair of electrodes, a reflector that reflects the light from the arc tube to a region to be illuminated, and an auxiliary mirror that reflects the light emitted from the arc tube to the region to be illuminated toward the reflector. The arc-tube drive unit drives the arc tube with an alternating current so that, of the pair of electrodes of the arc tube, the brightness of a first luminescent point generated in the vicinity of a first electrode adjacent to the auxiliary mirror is lower than the brightness of a second luminescent point generated in the vicinity of a second electrode remote from the auxiliary mirror.

With the light source according to the first aspect of the invention, the temperature in the first luminescent point can be prevented from becoming higher than that in the second luminescent point and as such, the temperature in the first electrode can be prevented or reduced from becoming higher than that in the second electrode. This prevents an early deterioration of the electrode adjacent to the auxiliary mirror to decrease the life of the arc tube.

In this case, the electrode adjacent to the auxiliary mirror is referred to as a first electrode and the electrode remote from the auxiliary mirror is referred to as a second electrode. The luminescent point generated in the vicinity of the first electrode is referred to as a first luminescent point, while the luminescent point generated in the vicinity of the second electrode is referred to as a second luminescent point.

In this case, it is preferable that the arc-tube drive unit has the function of driving the arc tube with an alternating current so that the temperature in the first luminescent point is substantially equal to the temperature in the second luminescent point.

This structure allows the temperature in the first luminescent point to be substantially equal to that in the second luminescent point, thus allowing the temperature in the first electrode to be substantially equal to that in the second electrode. This further prevents or reduces an early deterioration of the electrode adjacent to the auxiliary mirror to decrease the life of the arc tube.

In this case, the temperature in the first luminescent point is substantially equal to that in the second luminescent point can mean that the absolute value of the difference between the temperature in the first luminescent point and that in the second luminescent point is 10° C. or less.

In this case, the device for measuring the temperature in the arc tube (the temperatures of the luminescent points and the electrodes) may be a noncontact infrared thermometer, for example.

In this case, it is also preferable that the arc-tube drive unit has the function of driving the arc tube with an alternating current so that the maximum temperature in the first electrode is substantially equal to the temperature in the second electrode.

This structure allows the maximum temperature in the first electrode to be substantially equal to that in the second electrode, thereby further preventing or reducing an early deterioration of the electrode adjacent to the auxiliary mirror to decrease the life of the arc tube.

In this case, the maximum temperature in the first electrode is substantially equal to that in the second electrode is that the absolute value of the difference between the maximum temperature in the first electrode and that in the second electrode is 10° C. or less. In this case, it is preferable that the arc-tube drive unit has the function of driving the arc tube with an alternating current so that the accumulated lighting-up time in the first luminescent point is shorter than the accumulated lighting-up time in the second luminescent point.

This structure allows the brightness in the first luminescent point to be lower than that in the second luminescent point. This prevents or reduces the temperature of the first luminescent point from becoming higher than that of the second luminescent point, thus preventing the temperature in the first electrode from becoming higher than that in the second electrode. This further prevents or reduces an early deterioration of the electrode adjacent to the auxiliary mirror to decrease the life of the arc tube.

In this case, it is preferable that the arc-tube drive unit has the function of driving the arc tube with an alternating current so that the peak current of the first luminescent point during lighting-on is lower than the peak current of the second luminescent point during lighting-on.

Also this structure allows the brightness of the first luminescent point to be lower than that of the second luminescent point. This prevents the temperature in the first luminescent point from becoming higher than that in the second luminescent point, thus preventing the temperature in the first electrode from becoming higher than that in the second electrode. This prevents or reduces an early deterioration of the electrode adjacent to the auxiliary mirror to decrease the life of the arc tube.

In this case, the fact that the first luminescent point is generated in the vicinity of the first electrode is expressed as the first luminescent point is lit on, while the fact that the second luminescent point is generated in the vicinity of the second electrode is expressed as the second luminescent point is lit on.

An exemplary projector according to a second aspect of the invention includes an illumination system that emits light into a region to be illuminated, an electrooptic modulator that modulates the light from the illumination system according to image information, and a projection system that projects the modulated light from the electrooptic modulator. The illumination system includes the light source according to the embodiments of the invention.

Since the projector according to the second aspect of the invention exhibits high performance in which the frequency of replacement of the light source lamp in the light source is reduced, because it includes the excellent light source that has the above-described advantages.

A third aspect of the invention, can provide a method of driving an arc tube of a light source that includes a light source lamp and an arc-tube drive unit. The light source lamp can include an arc tube that emits light between a pair of electrodes, a reflector that reflects the light from the arc tube to a region to be illuminated, and an auxiliary mirror that reflects the light emitted from the arc tube to the region to be illuminated toward the reflector. The arc-tube drive unit drives the arc tube with an alternating current. The arc tube is driven with an alternating current so that, of the pair of electrodes of the arc tube, the brightness of a first luminescent point generated in the vicinity of a first electrode adjacent to the auxiliary mirror is lower than the brightness of a second luminescent point generated in the vicinity of a second electrode remote from the auxiliary mirror.

The arc-tube driving method according to the third aspect of the invention can prevent the temperature in the first luminescent point from becoming higher than that in the second luminescent point, thus preventing the temperature in the first electrode from becoming higher than that in the second electrode. This prevents or reduces an early deterioration of the electrode adjacent to the auxiliary mirror to decrease the life of the arc tube.

BRIEF DESCRIPTION OF THE DRAWINGS

The invention will be described with reference to the accompanying drawings, wherein like numbers reference like elements, and wherein.

DETAILED DESCRIPTION OF PREFERRED EMBODIMENTS

A light source, a projector, and a method of driving an arc tube according to exemplary embodiments of the invention will be described hereinbelow with reference to the drawings.

Figure 1:
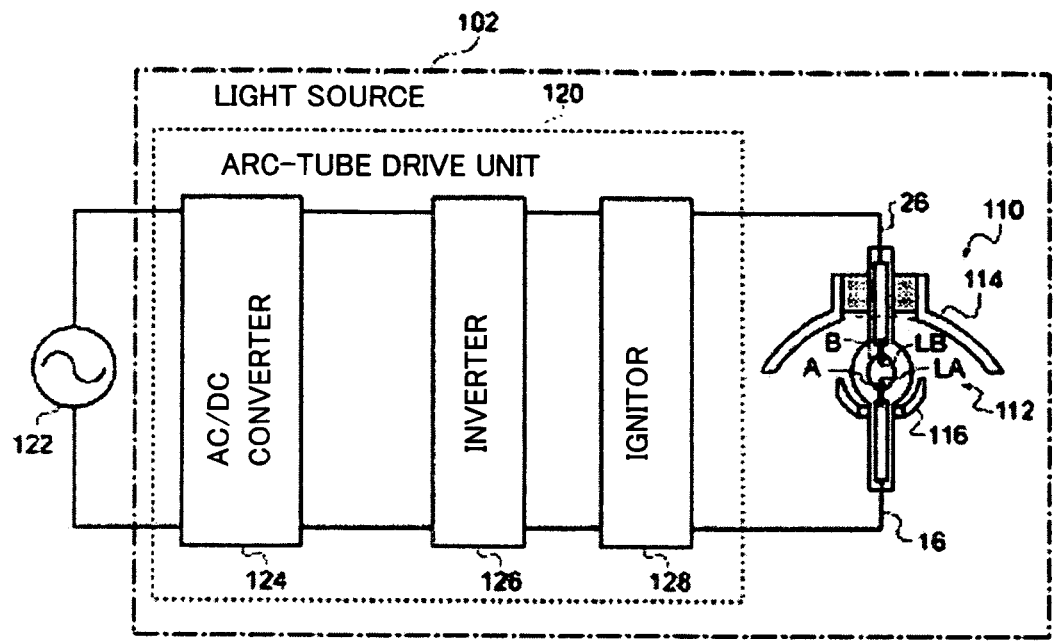
FIG. 1 is a schematic diagram showing the structure of a light source according to a first exemplary embodiment of the invention.
Figure 2:
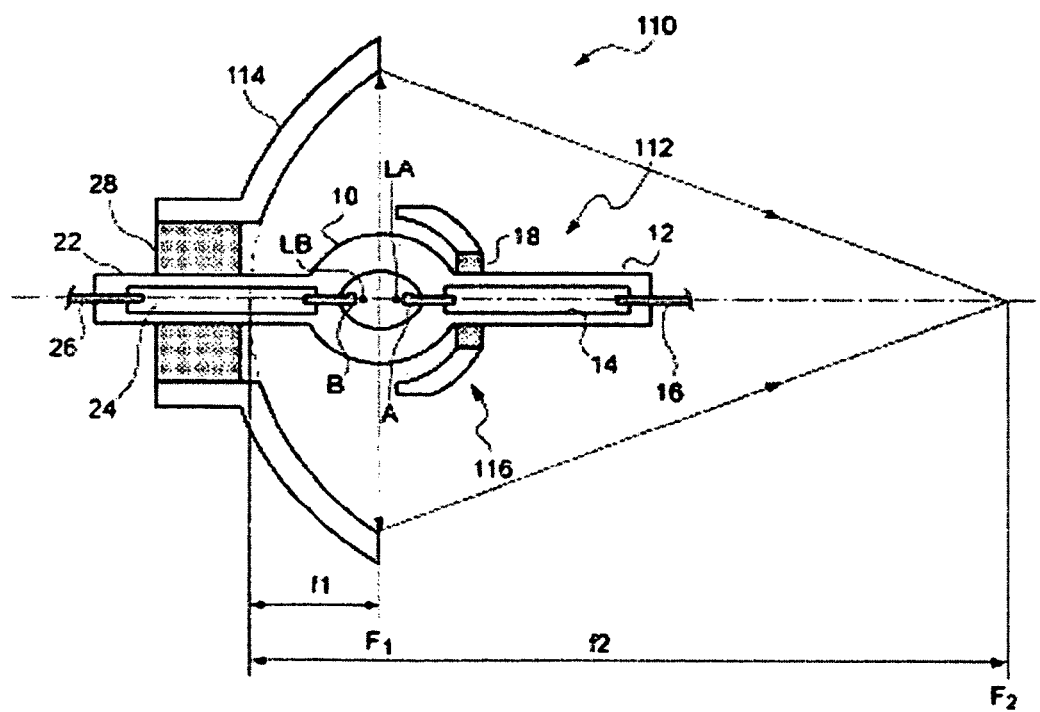
FIG. 2 is a schematic diagram showing the structure of a light source lamp according to the first exemplary embodiment.

A light source 102 according to a first exemplary embodiment will be described with reference to FIGS. 1 and 2. FIG. 1 is a schematic diagram showing the structure of the light source 102 according to the first exemplary embodiment. FIG. 2 is a schematic diagram showing the structure of a light source lamp 110 according to the first exemplary embodiment.

As shown in FIG. 1, the light source 102 according to the first exemplary embodiment can include the light source lamp 110 and an arc-tube drive unit 120 that drives an arc tube 112 of the light source lamp 110 with an alternating current. The light source lamp 110 can include the arc tube 112, an ellipsoidal reflector 114, and an auxiliary mirror 116.

The arc tube 112 can be made of, for example, quartz glass, and incorporates a light emitting section 10 having a pair of tungsten electrodes (a first electrode A and a second electrode B) therein and sealing sections 12 and 22 connecting to both sides of the light emitting section 10. The light emitting section 10 is hollow, in which mercury, rare gas, and halogen are sealed. The light emitting section 10 is disposed in the vicinity of focus $F_1$ of two focuses $F_1$ and $F_2$ of the ellipsoidal reflector 114. The sealing sections 12 and 22 contain metal foils 14 and 24 sealed in, which connect to the first electrode A and the second electrode B, respectively. To the metal foils 14 and 24, lead wires 16 and 26 are connected, respectively, to connect to the arc-tube drive unit 120.

The ellipsoidal reflector 114 is open to a region to be illuminated and disposed behind the light emitting section 10 of the arc tube 112 so that it reflects the light from the arc tube 112 into the region to be illuminated. The ellipsoidal reflector 114 has a through hole for the arc tube 112 (sealing section 22) to pass through. The through hole is filled with an inorganic adhesive agent 28, such as cement, to which the sealing section 22 of the arc tube 112 is fixed.

The ellipsoidal reflecting surface of the ellipsoidal reflector 114 is coated with a dielectric multilayer that is a reflection increasing layer by metallic-thin-film vapor deposition. The reflecting surface has a cold mirror that reflects visible light and transmits infrared and ultraviolet lights.

The auxiliary mirror 116 is disposed on the side of the light emitting section 10 adjacent to the region to be illuminated in the arc tube 112. The auxiliary mirror 116 has a reflecting concave surface that reflects the light from the arc tube 112 to the ellipsoidal reflector 114 and a through hole for mounting the auxiliary mirror 116 to the arc tube 112. The through hole is filled with an inorganic adhesive agent 18, such as cement, to which the sealing section 12 of the arc tube 112 is fixed.

The reflecting surface of the auxiliary mirror 116 is in the form of a concave surface following the spherical surface of the light emitting section 10 and is coated with a dielectric multilayer that is a reflection increasing layer, as is the reflecting surface of the ellipsoidal reflector 114. Also the reflecting surface of the auxiliary mirror 116 has a cold mirror that reflects only visible light and transmits infrared and ultraviolet lights.

The details of the light emitted from the arc tube 112 will now be described. Of the light emitted from the luminescent center of the light emitting section 10, the light traveling toward the ellipsoidal reflector 114 is reflected by the reflecting surface of the ellipsoidal reflector 114 to travel toward the focus $F_2$.

The light emitted from the luminescent center of the light emitting section 10 in the direction opposite to the ellipsoidal reflector 114 is reflected by the reflecting surface of the auxiliary mirror 116 toward the ellipsoidal reflector 114 and further reflected by the reflecting surface of the ellipsoidal reflector 114 to converge into the focus $F_2$.

Specifically, since the auxiliary mirror 116 is disposed, the light emitted from the light emitting section 10 in the direction opposite to the ellipsoidal reflector 114 (to the front) can be converged to the focus $F_2$ of the ellipsoidal reflector 114, as is the light that is incident directly on the reflecting surface of the ellipsoidal reflector 114 from the arc tube 112.

Accordingly, providing the auxiliary mirror 116 allows almost all the light emitted from the light emitting section 10 to be converged in position even when the reflecting surface of the ellipsoidal reflector 114 is small, thereby reducing the length of the ellipsoidal reflector 114 along the illumination axis and the diameter of the opening. This reduces the size of the light source lamp 110 and a projector including the same, facilitating the layout to assemble the light source lamp 110 in the projector.

Also, providing the auxiliary mirror 116 allows almost all the light emitted from the light emitting section 10 to be converged to the focus $F_2$ by the ellipsoidal reflector 114 and the auxiliary mirror 116, thus being available even when the focus $F_1$ and the focus $F_2$ of the ellipsoidal reflector 114 are brought close to each other to reduce the diameter of the concentrating spot at the focus $F_2$, thus substantially improving light use efficiency.

As shown in FIG. 1, the arc-tube drive unit 120 includes an AC/DC converter 124 that converts an alternating current supplied from a commercial power source 122 to a direct current, an inverter 126 that converts the direct current outputted from the AC/DC converter 124 to an alternating current with a specified frequency, and an ignitor 128 that applies high pulse voltage to between the electrodes at the start of the arc tube 112 to form a discharge path. The ignitor 128 connects to the lead wires 16 and 26 from the arc tube 112.

The light source 102 according to the first exemplary embodiment can be configured to turn on a first luminescent point LA and a second luminescent point LB alternately by the alternating current supplied from the arc-tube drive unit 120 to a first electrode A and a second electrode B of the arc tube 112.

Figure 3:
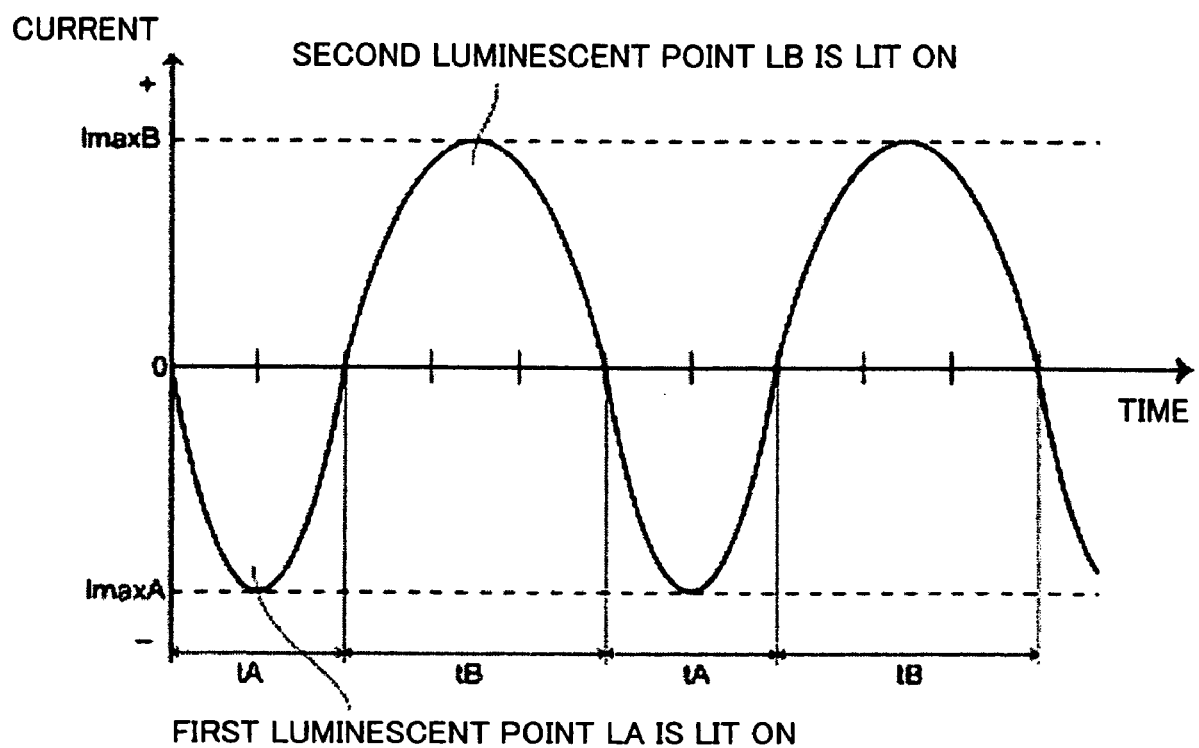
FIG. 3 is a graph that illustrates the function of an arc-tube drive unit according to the first exemplary embodiment.

Referring now to FIG. 3, the function of the arc-tube drive unit 120 according to the first exemplary embodiment will be described. FIG. 3 is a graph that illustrates the function of the arc-tube drive unit 120 according to the first exemplary embodiment. In FIG. 3, the absolute value |maxA| of a peak current |maxA| of the first luminescent point LA during lighting-on and the absolute value |maxB| of a peak current |maxB| of the second luminescent point LB during lighting-on has the relationship, |maxA|=|maxB|. The time tA (hereinafter, referred to as unit lighting-up time tA) while the first luminescent point LA stays on during one cycle of the alternating current and the time tB (hereinafter, referred to as unit lighting-up time tB) while the second luminous point LB stays on during one cycle of the alternating current has the relationship, tA<tB.

As shown in FIG. 3, the arc-tube drive unit 120 of the first exemplary embodiment has the function of repeating the operation of lighting on the first luminescent point LA by unit lighting-up time tA and then lighting it off, then lighting on the second luminescent point LB by unit lighting-up time tB and then light it off, and lighting on the first luminescent point LA by unit lighting-up time tA at every cycle of the alternating current, thereby driving the arc tube 112.

The accumulative lighting-up time of the arc-tube drive unit 120 according to the first embodiment is expressed as tA<tB, indicating that the accumulative lighting-up time of the first luminescent point LA is shorter than that of the second luminescent point LB. Accordingly, the arc-tube drive unit 120 of the first exemplary embodiment has the function of driving the arc tube 112 with an alternating current so that the brightness of the first luminescent point LA is lower than that of the second luminescent point LB.

Accordingly, the light source 102 according to the first embodiment can include the light source lamp 110 and the arc-tube drive unit 120. The light source lamp 110 includes the arc tube 112 that emits light between a pair of electrodes, the ellipsoidal reflector 114 that reflects the light from the arc tube 112 to a region to be illuminated, and the auxiliary mirror 116 that reflects the light emitted from the arc tube 112 to the region to be illuminated toward the ellipsoidal reflector 114. The arc-tube drive unit 120 drives the arc tube 112 with an alternating current so that, of the pair of electrodes of the arc tube 112, the brightness of the first luminescent point LA generated in the vicinity of the first electrode A adjacent to the auxiliary mirror 116 is lower than that of the second luminescent point LB generated in the vicinity of the second electrode B remote from the auxiliary mirror 116.

Therefore, in the light source 102 according to the first embodiment, the temperature of the first luminescent point LA is prevented from becoming higher than that of the second luminescent point LB, so that the temperature of the first electrode A is prevented from becoming higher than that of the second electrode B. This prevents or reduces an early deterioration of the electrode adjacent to the auxiliary mirror to decrease the life of the arc tube.

In the light source 102 according to the first embodiment, the arc-tube drive unit 120 has the function of driving the arc tube 112 with an alternating current so that the temperature of the first luminescent point LA is substantially equal to that of the second luminescent point LB.

This allows the temperature of the first luminescent point LA to be substantially equal to that of the second luminescent point LB, allowing the temperature of the first electrode A to become substantially equal to that of the second electrode B. This prevents or reduces an early deterioration of the electrode adjacent to the auxiliary mirror to decrease the life of the arc tube.

In the light source 102 according to the first embodiment, the arc-tube drive unit 120 has the function of driving the arc tube 112 with an alternating current so that the accumulated lighting-up time in the first luminescent point LA is shorter than that in the second luminescent point LB.

Thus, the brightness of the first luminescent point LA can be lower than that of the second luminescent point LB. This prevents the temperature of the first luminescent point LA from becoming higher than that of the second luminescent point LB, thus preventing the temperature of the first electrode A from becoming higher than that of the second electrode B. This prevents or reduces an early deterioration of the electrode adjacent to the auxiliary mirror to decrease the life of the arc tube.

A method of driving the arc tube according to the first embodiment will be described. The method of driving the arc tube according to the first embodiment is a method of driving the arc tube 112 of the light source 102 according to the first embodiment, whereby the arc tube 112 is driven with an alternating current so that the brightness of the first luminescent point LA is lower than that of the second luminescent point LB.

Accordingly, the method of driving the arc tube according to the first embodiment can prevent the temperature of the first luminescent point LA from becoming higher than that of the second luminescent point LB, thereby preventing the temperature of the first electrode A from becoming higher than that of the second electrode B. This prevents or reduces an early deterioration of the electrode adjacent to the auxiliary mirror to decrease the life of the arc tube.

Figure 4:
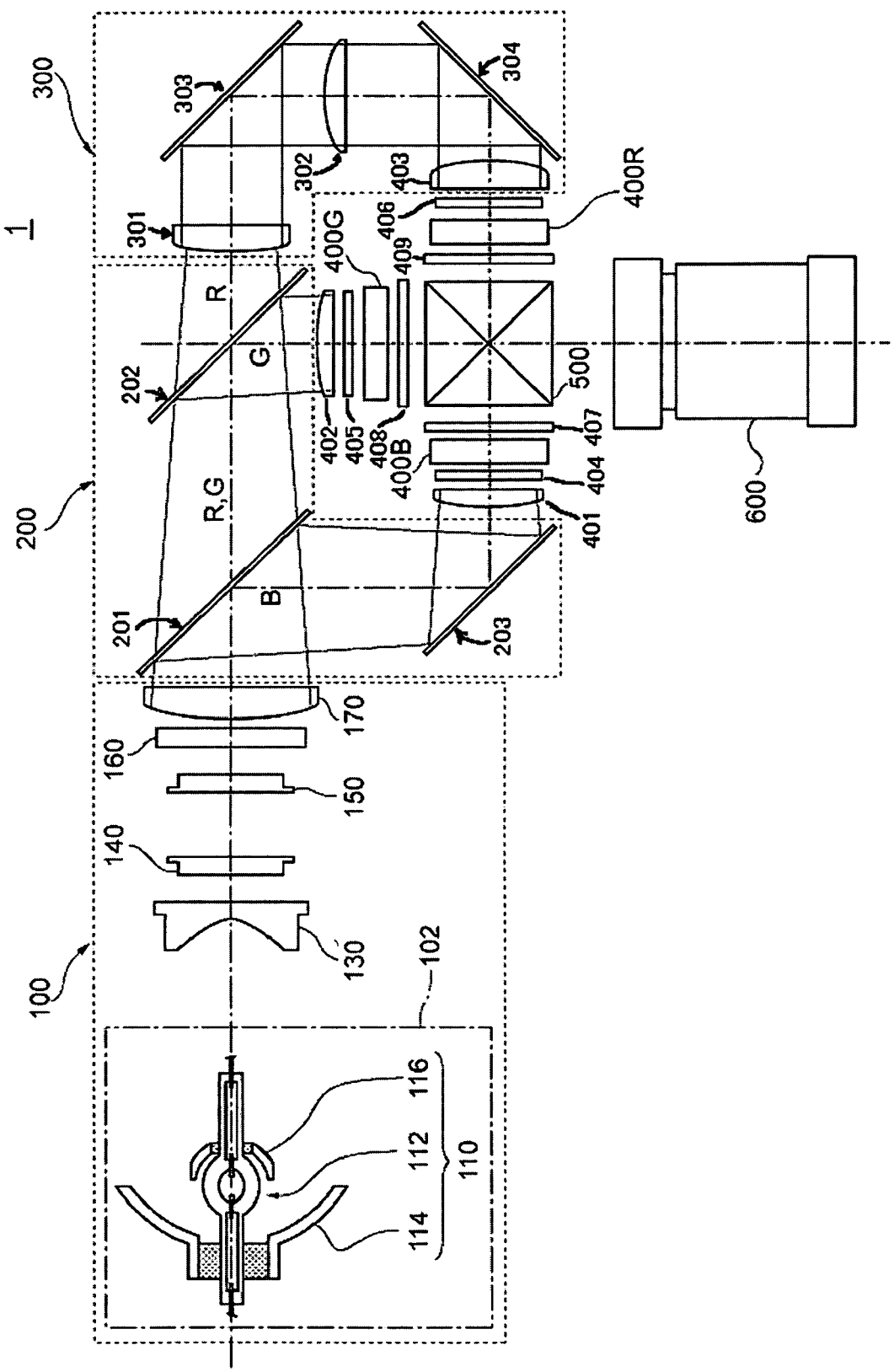
FIG. 4 is a diagram of the optical system of a projector according to the first embodiment.

Referring now to FIG. 4, a projector 1 according to the first exemplary embodiment will be described. FIG. 4 is a diagram of the optical system of the projector 1 according to the first embodiment. In FIG. 4, the arc-tube drive unit 120 (refer to FIG. 1) of the light source 102 is omitted.

As shown in FIG. 4, the projector 1 according to the first exemplary embodiment can include an illumination system 100, a color separation system 200, a relay system 300, three liquid crystal devices 400R, 400G, and 400B serving as electrooptic modulator, a cross dichroic prism 500, and a projection system 600.

The illumination system 100 can include the light source 102, a parallelizing lens 130, a first lens array 140, a second lens array 150, a polarization conversion element 160, and a superimposing lens 170.

The parallelizing lens 130 is for parallelizing the light emitted from the light source 102 and has a aspherical light-incident surface, for example, a hyperboloidal concave surface, and a flat light-exiting surface.

The first lens array 140 has the function as light splitting optical element for splitting the light exiting from the parallelizing lens 130 into multiple partial lights, and has multiple small lenses arranged in planes perpendicular to the illumination axis. The outline of each small lens is substantially similar to the shape of the image forming regions of the liquid crystal devices 400R, 400G, and 400B, to be described later.

The second lens array 150 is an optical element that collects the partial lights split by the first lens array 140, and has multiple small lenses that are arranged in planes perpendicular to the illumination axis, as with the first lens array 140. However, the outline of each small lens does not need to correspond to the shape of the image forming regions of the liquid crystal devices 400R, 400G, and 400B, because it is provided to collect the lights.

The polarization conversion element 160 is for arranging the direction of polarization of the partial lights split by the first lens array 140 in one direction.

The polarization conversion element 160 has a structure (not shown) in which polarization separation layers and reflection mirrors are arranged alternately at angle along the illumination axis. The polarization separation layers transmits one of P-polarized light and S-polarized light of the partial lights and reflects the other polarized light. The reflected polarized light is bent by the reflection mirror into the direction in which the transmitted polarized light travels, i.e., in the direction along the illumination axis X. The polarization of any one of the polarized lights is converted by a phase plate provided on the light exiting surface of the polarization conversion element 160, so that the directions of all the polarized lights are uniformed. The use of the polarization conversion element 160 allows the lights emitted from the light source 102 to be adjusted in one direction, thus improving the usage rate of the light-source light used in the liquid crystal devices 400R, 400G, and 400B.

The superimposing lens 170 is an optical element that concentrates the multiple partial lights that have passed through the first lens array 140, the second lens array 150, and the polarization conversion element 160 to superimpose them onto the image forming regions of the liquid crystal devices 400R, 400G, and 400B. The superimposing lens 170 of this embodiment can be an aspherical lens whose light-exiting-side end face in the light forming region is hyperboloidal. However, a spherical lens whose light-incident-side end face is flat and light-exiting-side end face is spherical can also be used.

The light exiting from the superimposing lens 170 enters the color separation system 200.

The color separation system 200 can include two dichroic mirrors 201 and 202 and a reflection mirror 203. The color separation system 200 has the function of separating the multiple partial lights emitted from the illumination system 100 into three colors, red (R), green (G) and blue (B) by the dichroic mirrors 201 and 202.

The two dichroic mirrors 201 and 202 are optical elements that have a wavelength selection film on the substrate, which reflects light with a specified wavelength region and transmits light with other wavelengths. The dichroic mirror 201 disposed upstream in the optical path reflects a blue light and transmits the other color lights. The dichroic mirror 202 arranged downstream in the optical path reflects a green light and transmits a red light.

The relay system 300 can include a light-incident side lens 301, a relay lens 302, and two reflection mirrors 303 and 304, and has the function of guiding the red light that has passed through the dichroic mirror 202 of the color separation system 200 to the liquid crystal device 400R. The reason that the relay system 300 is provided in the optical path for the red light is to prevent or reduce a decrease in usage efficiency due to light divergence etc., because the optical path of the red light is longer than that of the other color lights. This embodiment has such a structure because the optical path of the red light is longer than the others but may have a structure in which the optical path of a blue light is long.

A blue light separated by the dichroic mirror 201 is bent by the reflection mirror 203 and then supplied to the liquid crystal device 400B through a field lens 401. A green light separated by the dichroic mirror 202 is supplied to the liquid crystal device 400G through a field lens 402. A red light is concentrated and bent by the light-incident side lens 301, the relay lens 302, and the reflection mirrors 303 and 304 and sent to the liquid crystal device 400R through a field lens 403. The field lenses 401, 402, and 403 upstream in the respective color-light optical paths of the liquid crystal devices 400R, 400G, and 400B are provided to convert the partial lights exiting from the second lens allay 150 to lights parallel to the illumination optical axis.

The liquid crystal devices 400R, 400G, and 400B modulate the incident light in accordance with image information to form a color image and are the objects to be illuminated by the illumination system 100.

Between the field lenses 401, 402, and 403 and the liquid crystal devices 400R, 400G, and 400B, light incident-side polarizers 404, 405, and 406 are interposed, respectively. Between the liquid crystal devices 400R, 400G, and 400B and a cross dichroic prism 500, light exiting-side polarizers 407, 408, and 409 are interposed, respectively. The color lights are thus modulated by the light incident-side polarizers 404, 405, and 406, the liquid crystal devices 400R, 400G, and 400B, and the light exiting-side polarizers 407, 408, and 409.

The liquid crystal devices 400R, 400G, and 400B contain liquid crystal that is an electrooptic material sealed between a pair of transparent glass substrates. The liquid crystal devices 400R, 400G, and 400B modulate the direction of polarization of polarized lights exiting from the light incident-side polarizers 404, 405, and 406 according to a given image signal, for example, with a polysilicon TFT as switching device. The image forming regions for the modulation of the liquid crystal devices 400R, 400G, and 400B are rectangular and are 0.7 inch in diagonal size.

The cross dichroic prism 500 is an optical element that combines the optical images modulated for each of the color lights exiting from the light exiting-side polarizers 407, 408, and 409 to form a color image. The cross dichroic prism 500 is in approximately square shape in plan view in which four rectangular prisms are bonded together. The interfaces of the bonded rectangular prisms are coated with a dielectric multilayer. One of the substantially X-shaped dielectric multilayer reflects a red light, while the other dielectric multilayer reflects a blue light. The red light and the blue light are reflected by the dielectric multilayers and their directions are adjusted to the traveling direction of a green light and as such, the three color lights are combined.

The color image exiting from the cross dichroic prism 500 is projected on an enlarged scale by the projection system 600 to form a large-sized image on a screen (not shown).

The projector 1 according to the first exemplary embodiment can include the illumination system 100 that emits illumination light toward a region to be illuminated, the liquid crystal devices 400R, 400G, and 400B that modulate the illumination light from the illumination system 100 according to image information, and the projection system 600 that projects the modulated light from the liquid crystal devices 400R, 400G, and 400B. The illumination system 100 has the light source 102 according to the first embodiment.

Since the projector 1 according to the first exemplary embodiment exhibits high performance in which the frequency of replacement of the light source lamp 110 in the light source 102 is reduced, because it includes the excellent light source 102 that has the above-described advantages.

Figure 5:
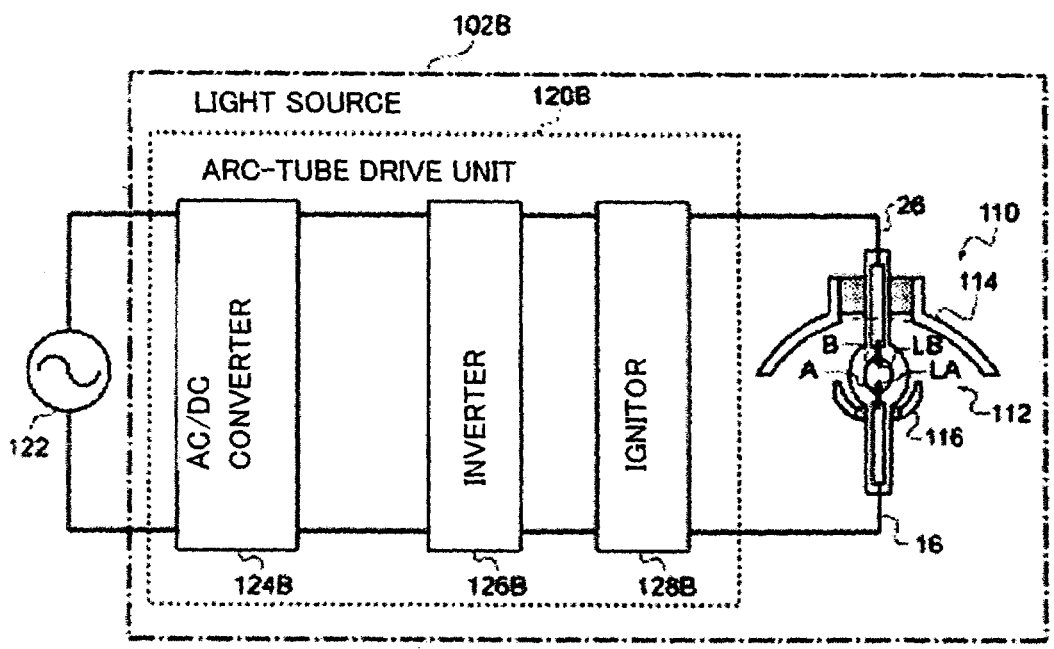
FIG. 5 is a schematic diagram showing the structure of a light source according to a second exemplary embodiment of the invention.
Figure 6:
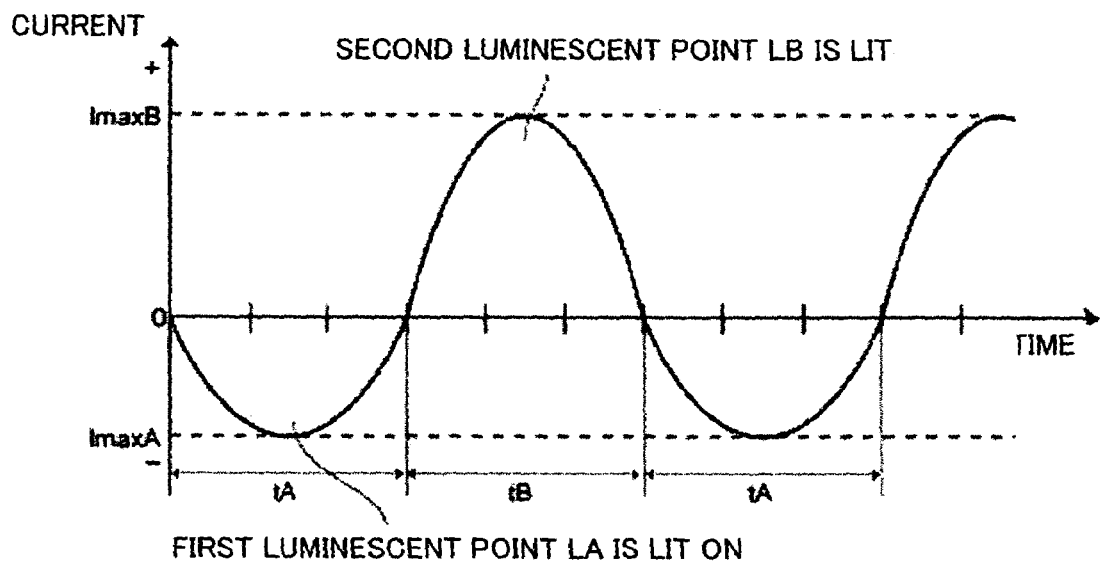
FIG. 6 is a graph that illustrates the function of an arc-tube drive unit according to the second exemplary embodiment.
Figure 7:
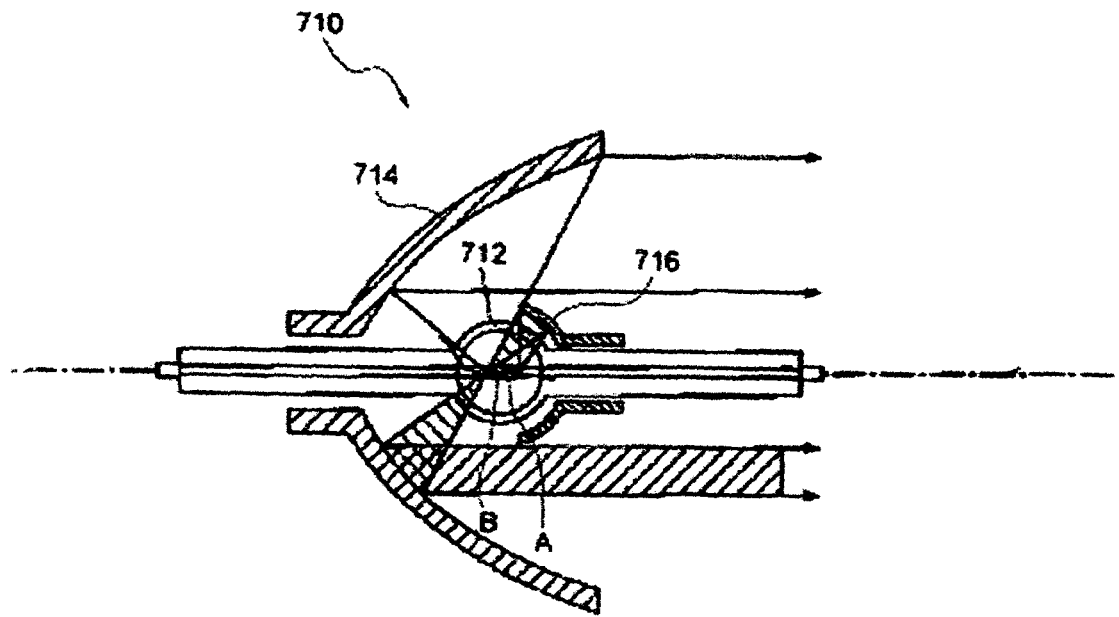
FIG. 7 is a schematic diagram showing the structure of a related-art light source lamp.
Figure 8:
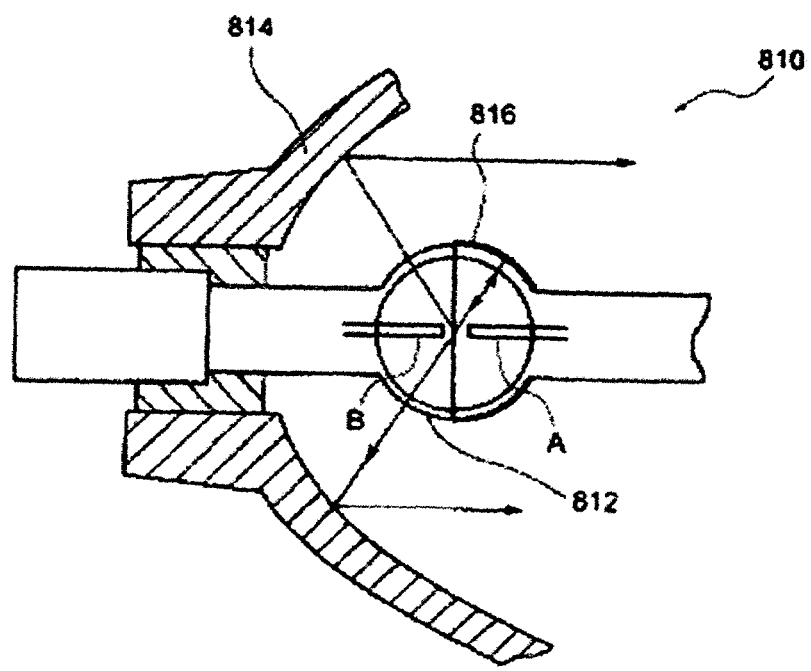
FIG. 8 is a schematic diagram showing the structure of another related-art light source lamp.

Referring to FIGS. 5 and 6, a light source 102B according to a second exemplary embodiment of the invention will be described. FIG. 5 is a schematic diagram showing the structure of the light source 102B according to the second exemplary embodiment. FIG. 6 is a graph for describing the function of an arc-tube drive unit according to the second exemplary embodiment.

Since the light source 102B according to the second exemplary embodiment has substantially the same structure as that of the light source 102 according to the first embodiment (refer to FIG. 1), as shown in FIG. 5, its detailed description will be omitted here.

The arc-tube drive unit 120B according to the second exemplary embodiment is different from the arc-tube drive unit 120 according to the first embodiment in the relationship of peak current and the relationship of accumulative lighting-up time.

More specifically, while the arc-tube drive unit 120 of the first embodiment has the relationship, |maxA|=|maxB| and tA<tB (refer to FIG. 3), the arc-tube drive unit 120B of the second exemplary embodiment has the relationship, |maxA|<|maxB| and tA=tB, as shown in FIG. 6.

The peak current of the arc-tube drive unit 120B of the second embodiment has the relationship |maxA|<|maxB|, in other words, the peak current of the first luminescent point LA during lighting-on is lower than that of the second luminescent point LB during lighting-on. This means that the arc-tube drive unit 120B of the second exemplary embodiment has the function of driving the arc tube 112 with an alternating current so that the first luminescent point LA is darker than the second luminescent point LB, as in the arc-tube drive unit 120 of the first embodiment.

In other words, the light source 102B according to the second embodiment has substantially the same structure as that of the light source 102 according to the first embodiment, in which the arc-tube drive unit 120B drives the arc tube 112 with an alternating current so that the first luminescent point LA is darker than the second luminescent point LB.

Therefore, in the light source 102B according to the second embodiment, the temperature of the first luminescent point LA is prevented or reduced from becoming higher than that of the second luminescent point LB and so the temperature of the first electrode A is prevented from becoming higher than that of the second electrode B. This prevents an early deterioration of the electrode adjacent to the auxiliary mirror to decrease the life of the arc tube.

In the light source 102B according to the second exemplary embodiment, the arc-tube drive unit 120B has the function of driving the arc tube 112 with an alternating current so that the peak current of the first luminescent point LA during lighting-on is lower than that of the second luminescent point LB during lighting-on.

Thus, the brightness of the first luminescent point LA can be lower than that of the second luminescent point LB. This prevents the temperature of the first luminescent point LA from becoming higher than that of the second luminescent point LB, thus preventing the temperature of the first electrode A from becoming higher than that of the second electrode B. This prevents or reduces an early deterioration of the electrode adjacent to the auxiliary mirror to decrease the life of the arc tube.

While the light source, the projector, and the method of driving the arc tube of the invention have been described, based on the preferred embodiments, it is to be understood that the invention is not limited to the foregoing exemplary embodiments. Accordingly, various modifications can be made therein without departing from the spirit and scope of the invention as follows:

In the foregoing embodiments, while the arc-tube drive units 120 and 120B have the function of driving the arc tube 112 with an alternating current so that the temperature of the first luminescent point LA is substantially equal to that of the second luminescent point LB, the invention is not limited to that. The arc-tube drive unit may have the function of driving the arc tube 112 with an alternating current so that the maximum temperature of the first electrode A is substantially equal to that of the second electrode B.

Thus, the maximum temperature of the first electrode can be made substantially equal to the maximum temperature of the second electrode. This can prevent or reduce an early deterioration of the electrode adjacent to the auxiliary mirror to decrease the life of the arc tube.

In the foregoing exemplary embodiments, while the peak current and the accumulative lighting-up time are set as in the above described relationship so that the brightness of the first luminescent point LA is lower than that of the second luminescent point LB, the invention is not limited to that. The absolute value |maxA| of the peak current ImaxA of the first luminescent point LA during lighting-on, the absolute value |maxB| of the peak current ImaxB of the second luminescent point LB during lighting-on, the unit lighting-up time tA of the first luminescent point LA, and the unit lighting-up time tB of the second luminescent point LB may be set at the optimum value.

In the foregoing embodiments, while sinusoidal alternating current has been described as an example of an alternating current for driving the arc tube 112, the invention is not limited to that, but may be a rectangular-wave alternating current.

In the foregoing embodiments, while the auxiliary mirror 116 that projects outside the arc tube has been described as an example of an auxiliary mirror, the invention is not limited to that, but may be an auxiliary mirror made of a reflection layer formed on the light emitting section of the arc tube.

In the foregoing embodiments, while the ellipsoidal reflector 114 is used as a reflector for reflecting the light from the arc tube into a region to be illuminated, the invention is not limited to that, but a paraboloidal reflector may be used.

In the foregoing embodiments, while two lens allays 140 and 150 that split the light from the light source lamp 110 into multiple partial lights are used, the invention may also be applied to a projector that does not use such lens allays.

In the foregoing embodiments, while a projector that uses a liquid crystal device as an electrooptic modulator has been described by way of example, the invention can also be applied to a projector that uses a modulator other than the liquid crystal device, for example, a modulator in which pixels are formed of micromirrors.

In the foregoing embodiments, while a projector that uses three liquid crystal devices has been described by way of example, the invention can also be applied to a projector that uses one, two, or four or more liquid crystal devices.

In the foregoing embodiments, while the invention has been described with reference to an example in which the invention is applied to a transmission projector, the invention can also be applied to a reflection projector. Here the "transmission projector" is of a type in which the light valve such as a liquid crystal device transmits light, and the "reflection projector" is of a type in which the light valve reflects light. With the reflection projector, the light valve can be constructed of only a liquid crystal device, being in no need for a pair of polarizers. In the reflection projector, the cross dichroic prism can be used as color-light separation means for separating illumination light into three colors of red, green, and blue and also as color-light combining means for combining the modulated three color lights again and sending it in the same direction. Not the cross dichroic prism but a dichroic prism having a combination of multiple triangular or quadratic dichroic prisms may be used. Application of the invention to the reflection projector also offers substantially the same advantages as those of the transmission projector.

There are a front projector that projects an image from the direction in which the projection surface is observed and a back projector that projects an image from the side opposite to the direction in which the projection surface is observed. The foregoing embodiments can be applied to both of them.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A light source, comprising:
   a light source lamp including an arc tube that emits light between a pair of electrodes, a reflector that reflects the light from the arc tube to a region to be illuminated, and an auxiliary mirror that reflects the light emitted from the arc tube to the region to be illuminated toward the reflector;
   an arc-tube drive unit that drives the arc tube with an alternating current; and
   the arc-tube drive unit driving the arc tube with an alternating current so that, of the pair of electrodes of the arc tube, the brightness of a first luminescent point generated in the vicinity of a first electrode adjacent to the auxiliary mirror is lower than the brightness of a second luminescent point generated in the vicinity of a second electrode remote from the auxiliary mirror.

2. The light source according to claim 1,
   the arc-tube drive unit having the function of driving the arc tube with an alternating current so that the temperature in the first luminescent point is substantially equal to the temperature in the second luminescent point.

3. The light source according to claim 1,
   the arc-tube drive unit having the function of driving the arc tube with an alternating current so that a maximum temperature in the first electrode is substantially equal to the temperature in the second electrode.

4. The light source according to claim 1,
   the arc-tube drive unit having the function of driving the arc tube with an alternating current so that an accumulated lighting-up time in the first luminescent point is shorter than an accumulated lighting-up time in the second luminescent point.

5. The light source according to claim 1,
   the arc-tube drive unit having the function of driving the arc tube with an alternating current so that a peak current of the first luminescent point during lighting-on is lower than a peak current of the second luminescent point during lighting-on.

6. A projector, including:

an illumination system that emits light into a region to be illuminated;

an electrooptic modulator that modulates the light from the illumination system according to image information;

a projection system that projects the modulated light from the electrooptic modulator; and the illumination system including a light source, the light source, comprising:

a light source lamp including an arc tube that emits light between a pair of electrodes, a reflector that reflects the light from the arc tube to a region to be illuminated, and an auxiliary mirror that reflects the light emitted from the arc tube to the region to be illuminated toward the reflector;

an arc-tube drive unit that drives the arc tube with an alternating current; and the arc-tube drive unit driving the arc tube with an alternating current so that, of the pair of electrodes of the arc tube, the brightness of a first luminescent point generated in the vicinity of a first electrode adjacent to the auxiliary mirror is lower than the brightness of a second luminescent point generated in the vicinity of a second electrode remote from the auxiliary mirror.

7. The projector according to claim 6, the arc-tube drive unit having the function of driving the arc tube with an alternating current so that the temperature in the first luminescent point is substantially equal to the temperature in the second luminescent point.

8. The projector according to claim 6, the arc-tube drive unit having the function of driving the arc tube with an alternating current so that a maximum temperature in the first electrode is substantially equal to the temperature in the second electrode.

9. The projector according to claim 6, the arc-tube drive unit having the function of driving the arc tube with an alternating current so that an accumulated lighting-up time in the first luminescent point is shorter than an accumulated lighting-up time in the second luminescent point.

10. The projector according to claim 6, the arc-tube drive unit having the function of driving the arc tube with an alternating current so that a peak current of the first luminescent point during lighting-on is lower than a peak current of the second luminescent point during lighting-on.

11. A method of driving an arc tube of a light source that includes a light source lamp and an arc-tube drive unit, the light source lamp including an arc tube that emits light between a pair of electrodes, a reflector that reflects the light from the arc tube to a region to be illuminated, and an auxiliary mirror that reflects the light emitted from the arc tube to the region to be illuminated toward the reflector, and the arc-tube drive unit driving the arc tube with an alternating current, the arc tube being driven with an alternating current so that, of the pair of electrodes of the arc tube, a brightness of a first luminescent point generated in the vicinity of a first electrode adjacent to the auxiliary mirror is lower than a brightness of a second luminescent point generated in the vicinity of a second electrode remote from the auxiliary mirror.

* * * * *